United States Patent [19]
Swartz

[11] 3,771,754
[45] Nov. 13, 1973

[54] LITTER CONTAINER FOR AUTOMOBILES

[76] Inventor: William Swartz, 1430 Wrightwood, Highland Park, Ill. 60614

[22] Filed: Mar. 13, 1972

[21] Appl. No.: 234,244

[52] U.S. Cl................ 248/311, 206/19.5 R, 211/74
[51] Int. Cl.............................................. A47k 1/08
[58] Field of Search.................... 248/311, 309, 315; 211/74, 71; 206/19.5 R, 19.5 B; 224/29 R

[56] References Cited
UNITED STATES PATENTS

| 3,357,614 | 12/1967 | Berg | 206/19.5 R X |
| 3,104,040 | 9/1963 | Stevens | 248/311 X |
| 3,409,193 | 11/1968 | Metcalf | 224/29 R |
| 3,648,830 | 3/1972 | Grof | 248/311 X |
| 2,564,997 | 8/1951 | Rome | 248/311 X |
| 3,432,136 | 3/1969 | Renney | 248/315 |
| 3,311,276 | 3/1967 | Fromm | 224/29 R |

Primary Examiner—J. Franklin Foss
Attorney—Morris Spector

[57] ABSTRACT

A litter container including a container body for receiving litter and a mounting clip for mounting the body. The clip is constructed to perform an auxilliary function, namely that of receiving and releasably holding an object outside of the container. The object may be a drinking glass, a bottle, or any accessory that an occupant of the automobile may wish to have handy, such as a book, a road map, a chart, etc.

8 Claims, 4 Drawing Figures

PATENTED NOV 13 1973　　　　　　　　　　　　　　　3,771,754
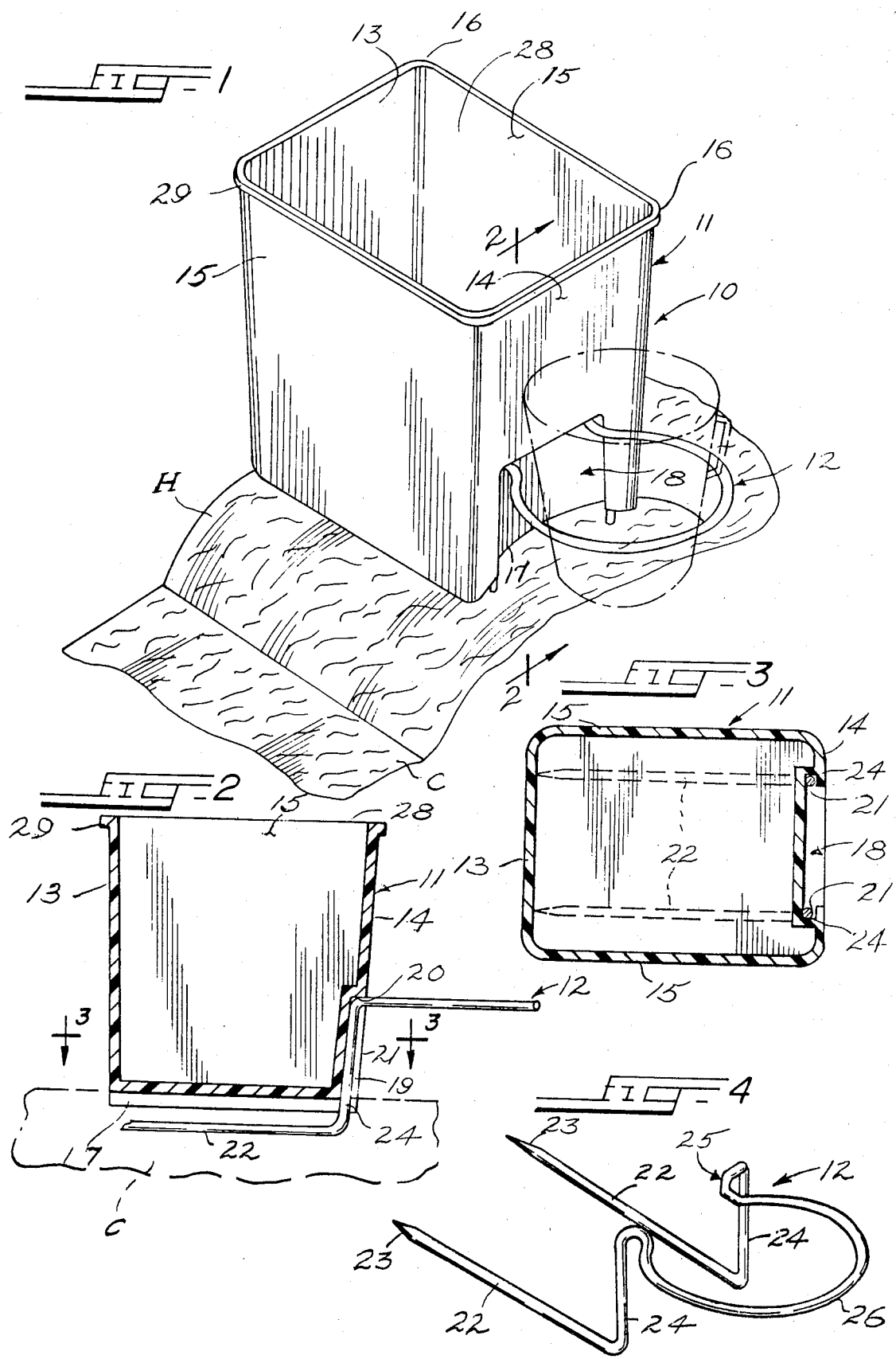

LITTER CONTAINER FOR AUTOMOBILES

OBJECTS OF THE INVENTION

This invention relates to a litter container with mounting means adapted for detachably fastening it in an automobile, and having means for releasably holding an object in a position readily accessible to an occupant of the automobile. The object held may be a drinking glass, a bottle containing a beverage, a thermos bottle, a baby bottle, or the like. The object holding means, which is part of the litter mount, may be in the form of a clip that resiliently holds an object such as a book, a road map, a chart, etc., in a position to be readily accessible to an occupant of the car.

It is an object of this invention to provide a litter container of the type that has mounting means for mounting it in an automobile, with means for releasably holding an accessory readily available for use by an occupant of the automobile.

A further object of this invention is to provide an accessory holding means that is a part of the holding means for the litter receptacle.

Another object of this invention is to provide a mounting means of the above character that can hold an accessory in a position readily available for use whether or not the litter container is in place and which will not interfer with the positioning or removal of the litter receptacle.

THE DRAWINGS

The accompanying drawing illustrates the preferred embodiment of the invention in which:

FIG. 1 is a perspective view of a litter container assembly of the present invention mounted in the front compartment of an automobile;

FIG. 2 is a cross section taken along the lines 2-2 of FIG. 1 with a cup shown in phantom in the clip;

FIG. 3 is a cross section taken along the line 3—3 of FIG. 2; and

FIG. 4 is a perspective view of the mounting clip.

DESCRIPTION

A litter container 10 of the present invention is shown positioned on the transmission hump H in a conventional passenger automobile. The hump H is on the floor of the automobile lengthwise and about midway between the left and right sides of the car and when the litter container is mounted thereon, in this instance in the front compartment of the automobile, it is between the driver and a passenger that may be on the front seat, and is accessible to both. The hump is conventionally covered by carpeting C, which is easily piercable by a pin or a tine.

The assembly 10 includes an open top generally rectangular one piece container body 11 of molded plastic, and a spring wire clip 12, on which, in the form of the invention shown, the body 11 is mounted and from which the body 11 may be slipped off for emptying. The body 11 includes rear and front walls 13—14 and side walls 15—15, with rounded corners 16, all joined with a bottom 17. A reinforcing top rim 29 surrounds the open top 28. The bottom 17 is concave to conform to the contour of the hump H.

The front wall 14 has a clip receiving recess 18 defined by a pair of spaced upstanding side panels 19 and a horizontal panel 20. The side panels 19 have overhanging lips that form a pair of spaced parallel vertical grooves or keyways 21. The keyways 21 are open at their bottom to accommodate parallel limbs 24—24 of the clip 12.

The clip 12 is a one piece spring metal wire. It has a pair of parallel tines 22—22 each terminating in a pointed end 23, adapted to penetrate the carpeting on the hump H, for insertion of the tines through the carpeting to the position of FIG. 2. Extending upwardly of tines are parallel vertical clip limbs 24-24 that are receivable within the respective keyways 21—21 and exert a spring pressure sideways therein. Each limb 24 terminates at its top in an inwardly projecting portion 25, the two of which are joined by a loop 26 that extends through an arc substantially greater than 180°. In the embodiment shown, the arcuate center line of the loop wire lies in a plane that is parallel to the tines 22—22 but above the plane of the tines. A cup, bottle or the like may be inserted into the loop to rest on the hump H of the car and be supported by the loop against overturning.

If desired the loop 26 of the spring wire clip may be formed so that it extends upwardly from the limbs 25 and exerts a spring pressure against the top rim 29 of the container body 11 when the container body is assembled with the spring clip. At that time the clip can serve for holding in place, by spring pressure, papers, maps or the like that may be inserted between the loop 26 and the body 11. Such papers, maps or the like are thus readily accessible to each of the two occupants of the front seat (or seats) of the automobile.

I claim:

1. A litter container for mounting in an automobile, said container comprising a body and a wire mounting clip therefor, said clip having a portion extending outside of the body for releasably holding outside of and adjacent to the body, an accessory for use by an occupant in the automobile, the body having a pair of clip-receiving grooves on an outer wall thereof and the clip having a pair of upright limbs slidable in the grooves.

2. A structure of claim 1 wherein the extended mounting portion is arcuate in shape and of an extent that is more than 180°.

3. A structure of claim 2 wherein the mounting clip includes a pair of penetrating tines.

4. A structure of claim 3 wherein the tines are parallel to one another and wherein the loop is in a plane parallel to and spaced from the tines.

5. A structure of claim 4 wherein the mounting clip and the container body are in slidable spring pressure engagement with one another and with one embracing the other.

6. A litter container that includes along the outside surface thereof a pair of spaced apart clip receiving grooves that extend to and are open at the bottom and are located at the front of the container, a mounting clip having a pair of upstanding limbs on which the container may be slid for mounting it, said limbs terminating in tines extending below the bottom of the container towards the rear of the container which tines terminate in penetrating points located rearwardly of the front wall of the container.

7. A structure of claim 6 wherein said upstanding limbs are joined by a loop constituting a part of the wire mounting clip, which loop extends through an arc of more than 180°.

8. A litter container for mounting in an automobile, said container comprising a body and a wire mounting clip therefor, said clip having a portion extending outside of the body for releasably holding outside of and adjacent to the body, an accessory for use by an occupant in the automobile, the wire clip having limbs at an angle to and extending from the ends of said extended portion, which limbs together serve to hold the container body, and from each of said limbs the wire being bent to form end portions for mounting the wire in position in an automobile.

* * * * *